(12) United States Patent
Manubolu et al.

(10) Patent No.: US 8,459,577 B2
(45) Date of Patent: Jun. 11, 2013

(54) DECOUPLED VALVE ASSEMBLY AND FUEL INJECTOR USING SAME

(75) Inventors: Avinash R. Manubolu, Edwards, IL (US); Shriprasad G. Lakhapati, Peoria, IL (US); Stephen Lewis, Chillicothe, IL (US); Christopher D. Hanson, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 926 days.

(21) Appl. No.: 12/217,626

(22) Filed: Jul. 8, 2008

(65) Prior Publication Data
US 2010/0006679 A1    Jan. 14, 2010

(51) Int. Cl.
- B05B 1/30    (2006.01)
- F02M 51/00    (2006.01)
- F02M 63/00    (2006.01)
- F16K 31/02    (2006.01)

(52) U.S. Cl.
USPC .................. 239/585.4; 239/585.5; 239/569; 123/447; 251/129.21

(58) Field of Classification Search
USPC ............... 239/585.5, 569, 584, 585.1, 585.2, 239/585.3, 585.4; 123/299, 446, 447, 467, 123/468; 251/129.15, 129.16, 129.21
See application file for complete search history.

(56) References Cited

U.S. PATENT DOCUMENTS

| | | | | |
|---|---|---|---|---|
| 2,356,134 A | * | 8/1944 | Voit | 239/585.2 |
| 4,008,876 A | * | 2/1977 | Bastle | 251/129.19 |
| 4,938,451 A | | 7/1990 | Weaver et al. | |
| 5,139,224 A | | 8/1992 | Bright | |
| 5,775,599 A | * | 7/1998 | Smith et al. | 239/585.3 |
| 5,823,445 A | | 10/1998 | Sofer | |
| 5,911,401 A | | 6/1999 | Hrytzak et al. | |
| 6,105,884 A | | 8/2000 | Molnar et al. | |
| 6,155,503 A | * | 12/2000 | Benson et al. | 239/585.1 |
| RE37,241 E | * | 6/2001 | Gustafson | 123/500 |
| 6,422,223 B2 | | 7/2002 | Meilinger et al. | |
| 6,439,214 B1 | | 8/2002 | Yew | |
| 6,550,699 B2 | | 4/2003 | Nagai et al. | |
| 6,561,436 B1 | * | 5/2003 | Boecking | 239/102.2 |
| 6,772,743 B2 | | 8/2004 | Nydam | |
| 6,796,543 B2 | * | 9/2004 | Haeberer et al. | 251/50 |
| 7,077,381 B2 | | 7/2006 | Wiemken et al. | |
| 7,320,441 B2 | * | 1/2008 | Boehland | 239/533.11 |
| 7,331,329 B2 | | 2/2008 | Tian et al. | |
| 7,347,383 B2 | | 3/2008 | Dallmeyer et al. | |
| 2002/0104977 A1 | | 8/2002 | Bircann et al. | |
| 2005/0161537 A1 | | 7/2005 | Mizuno et al. | |
| 2006/0138374 A1 | | 6/2006 | Lucas et al. | |
| 2007/0252100 A1 | | 11/2007 | Kitagawa et al. | |
| 2009/0277423 A1 | * | 11/2009 | Cooke | 123/494 |

OTHER PUBLICATIONS

Anonymous, Research Diclosure #506087: Common Rail Fuel Injector Assembly, Published Jun. 2006.*

* cited by examiner

*Primary Examiner* — Len Tran
*Assistant Examiner* — Justin Jonaitis
(74) *Attorney, Agent, or Firm* — Liell & McNeil

(57) ABSTRACT

A valve assembly including an armature and a valve member that are coupled when the solenoid coil is de-energized but are decoupled after the solenoid coil is energized. A first spring biases the armature and the valve member to a closed valve seat position while a second spring having a smaller preload than the first spring biases the valve member to an open valve seat position. When the solenoid coil is energized, the magnetic force of the coil overcomes the force exerted by the first spring pulling the armature away from the valve member. The valve member moves to the open valve seat position by the force exerted by the second spring. When the coil is de-energized, the magnetic force decays, thereby allowing the armature and the valve member to re-couple.

18 Claims, 3 Drawing Sheets

DECOUPLED VALVE ASSEMBLY AND FUEL INJECTOR USING SAME

TECHNICAL FIELD

The present disclosure relates generally to valve assemblies, and more particularly, to a fuel injector including a valve assembly having an armature and a valve member that may be decoupled.

BACKGROUND

Valve assemblies are commonly used in fuel injectors to control the flow of fuel through a nozzle outlet. One example of a valve assembly used in a fuel injector is a solenoid actuated valve assembly including a stator assembly, an armature, and a valve member. Typical solenoid actuated fuel injectors include a valve assembly that attaches the armature to a guide piece, which is coupled to the valve member. Due to movement of the guide piece under the influence of magnetic fields acting upon the armature via the stator assembly, the valve member moves between stops, such as a low-pressure seat and a high-pressure seat, which ultimately controls the flow of fuel passing through the nozzle outlet of the fuel injector. When the armature is coupled to the valve member, the valve assembly functions as a single unit, i.e., movement of the armature causes movement of the valve member, and vice versa. Coupling of the armature with the valve member throughout all modes of operation of the fuel injector may affect the performance of the fuel injector. For example, such coupling may hinder or compromise the various objectives of a solenoid actuated valve assembly, including maintaining the parallelism between the armature and the stator assembly, maintaining the perpendicularity of the guide piece to the stator assembly, minimizing side forces that may result in an imbalanced orientation and increased wear, minimizing the separation air gap between the armature and the stator assembly to maximize force, and enhancing the speed of armature travel.

Moreover, a coupled valve member has a valve travel distance equal to the armature travel distance, which may not always be desirable because the valve member only needs to travel a distance between the low-pressure seat and the high-pressure seat, while the armature needs to travel a greater distance between the initial air gap and the final air gap.

One example of a coupled valve member and an armature of a solenoid actuated valve assembly is provided in U.S. Pat. No. 7,347,383 (the '383 patent), which discloses an armature and a valve member that are connected together by a non-ferrous material in order to prevent any leakage of magnetic flux from the armature to the valve member. However, the '383 patent fails to address the problems associated with the physical coupling of the armature and the valve member such as the slower armature travel speeds, the inability to have different armature and valve member travel distances and travel speeds, and the difficulty of producing a single unit with ever-tighter tolerances so that the valve assembly can reduce variability when the armature is coupled to the valve member.

The present disclosure is directed to overcoming one or more of the problems set forth above.

SUMMARY

In one aspect, a valve assembly comprises an armature that is movable between a first armature position and a second armature position defined by an armature travel distance. A control valve member is movable between a first valve position and a second valve position defined by a valve travel distance. The armature travel distance is greater than the valve travel distance.

In another aspect, a fuel injector assembly comprises an injector body defining a nozzle outlet and a valve assembly includes an armature and a control valve member. The armature is movable between a first armature position and a second armature position that is defined by an armature travel distance. The control valve member is movable between a first valve position and a second valve position that is defined by a valve travel distance. The armature travel distance is greater than the valve travel distance.

In yet another aspect, a method of operating a fuel injector assembly includes the steps of initiating an injection event by decoupling an armature of a valve assembly from a control valve member of the valve assembly. The injection event ends by coupling the armature back to the control valve member.

DETAILED DESCRIPTION

Figure 1:
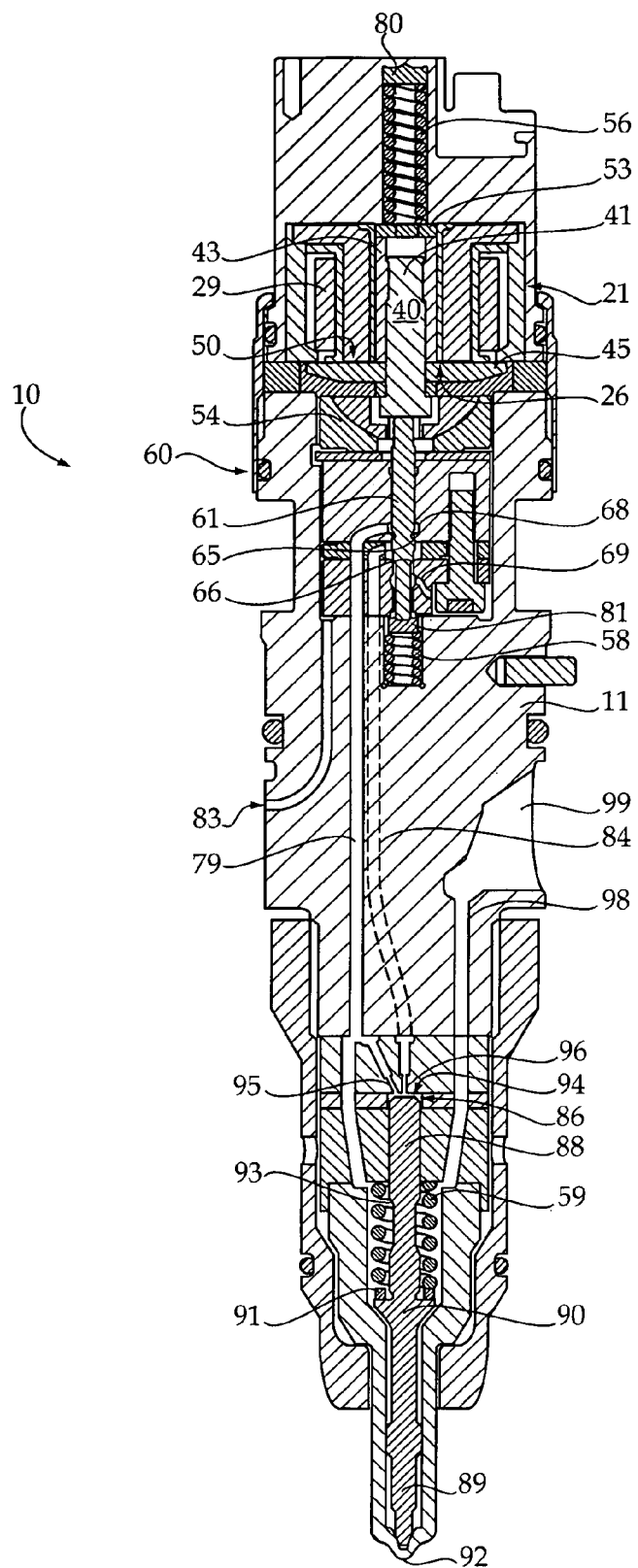
FIG. 1 is a sectioned front view of a fuel injector according to the present disclosure.
Figure 2:
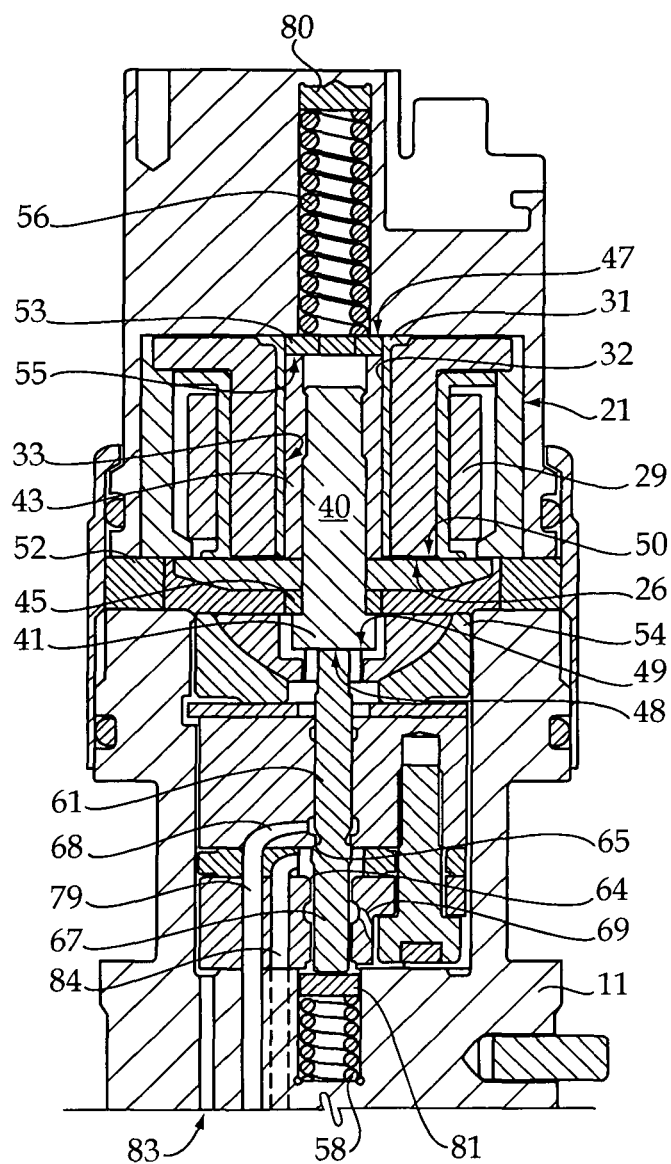
FIG. 2 is an enlarged sectioned front view of a control valve assembly of the fuel injector shown in FIG. 1.

Referring to FIGS. 1 and 2, an exemplary embodiment of a fuel injector 10 is illustrated. Although the embodiment described herein reflects the embodiment shown in FIGS. 1 and 2, those skilled in the art may appreciate that a fuel injector according to the present disclosure may be made in a wide variety of configurations, such as cam-actuated and hydraulically actuated fuel injectors.

The fuel injector 10 shown in FIGS. 1 and 2 includes a valve needle member 90 that opens and closes a nozzle outlet 92 and a solenoid actuated valve assembly 60, which includes a stator assembly 21, an armature assembly 40, and a control valve member 61. The stator assembly 21 includes a solenoid coil 29, a planar bottom surface 26, and a guide sleeve 31. The guide sleeve 31 has an inner guide surface 32 that defines a guide bore 33.

The armature assembly 40 may include a flux piece 45 attached to a guide piece 43 that moves within the guide bore 33 of the stator assembly 21 perpendicular to the planar bottom surface 26 of the stator assembly 21. The flux piece 45 may be threadably attached to the guide piece 43 via a contact pin 41. The flux piece 45 may be made of a soft, magnetic material while the guide piece 43 may be made of a hard, non-magnetic material that can withstand the wear caused by any contact with the inner guide surfaces 32 of the guide sleeve 31. This disclosure pertains to a wide array of different armature assemblies including the ones described herein and others that may fall within the spirit of the disclosure. In the present disclosure, the contact pin 41 of the armature assembly 40 has a control valve contact surface 48. Further, the guide piece 43 may have a guide stop contact surface 47.

The armature assembly 40 may be biased away from the planar bottom surface 26 of the stator assembly 21 by a first spring 56 having a first preload. A first spring spacer 80 may be placed adjacent the first spring 56 and may set the first preload. Because of the variations in components during production, category parts such as spring spacers may be selected from a wide variety of thickness dimensions to account for the variations of components used in one fuel injector from that of another.

Figure 3:
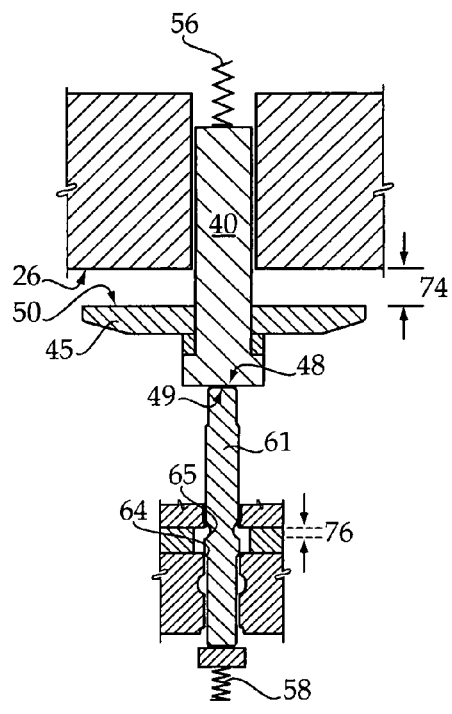
FIG. 3 is a schematic sectioned front view of the valve assembly of FIG. 1 where the armature assembly is coupled to the control valve member when the solenoid coil is de-energized.
Figure 4:
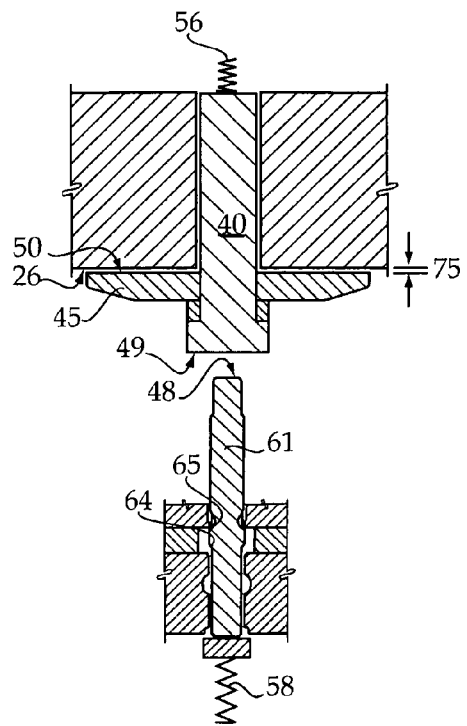
FIG. 4 is a schematic sectioned front view of the valve assembly of FIG. 1 where the armature assembly is decoupled from the control valve member after the solenoid coil is energized.

Referring also to FIG. 3 and FIG. 4, when the solenoid coil 29 is de-energized, the armature assembly 40 is at a first armature position, i.e., an initial air gap position, which defines an initial air gap 74 between a top surface 50 of the flux piece 45 and the planar bottom surface 26 of the stator assembly 21. The initial air gap 74 is the maximum distance between the top surface 50 of the flux piece 45 and the planar bottom surface 26 of the stator assembly 21 during operation of the fuel injector 10. The initial air gap 74 may be set using an over travel spacer 52, whose thickness dimension is selected such that the initial air gap 74 is set at a predetermined distance. When the solenoid coil 29 is energized as shown in FIG. 4, the armature assembly 40 moves to a second armature position, i.e., a final air gap position, which defines a final air gap 75 between the top surface 50 of the flux piece 45 and the planar bottom surface 26 of the stator assembly 21.

The final air gap 75 may be set using a final air gap spacer 53, which, similar to the over travel spacer 52, may have a thickness dimension selected such that the final air gap 75 of the fuel injector 10 is set at a predetermined distance. In an exemplary embodiment, the final air gap 75 is greater than zero, because contact between the flux piece 45 and the stator assembly 21 is undesirable. Further, when the solenoid coil 29 is in an energized state, the stop contact surface 47 of the guide piece 43 may be in contact with a guide contact surface 55 of final air gap spacer 53. The distance between the initial air gap position and the final air gap position of the armature assembly 40 defines an armature travel distance.

The solenoid actuated valve assembly 60 also includes a control valve member 61 that is biased towards the armature assembly 40 via a second spring 58 having a second preload. A first end 67 of the control valve member 61 may be in contact with a second spring spacer 81, which may set the preload of the second spring 58. In an exemplary embodiment, the preload of the second spring 58 should be smaller than the preload of the first spring 56. The control valve member 61 may have an armature contact surface 49 adjacent the armature assembly 40. The control valve member 61 moves between two valve positions or stops, such as a first valve position, which may correspond to a low-pressure valve seat 64 and a second valve position, which may correspond to a high-pressure valve seat 65. The control valve member 61 travels a valve travel distance 76 that is equal to the distance moved by the control valve member 61 between the low-pressure valve seat 64 and the high-pressure valve seat 65. In an exemplary embodiment, the valve travel distance 76 is smaller than the armature travel distance, thereby allowing the armature assembly 40 to come out of contact with, i.e., decouple from, the control valve member 61 after the solenoid coil 29 is energized. When the control valve member 61 and the armature assembly 40 come out of contact with one another, then the control valve member 61 and the armature assembly 40 are considered to be decoupled. When the armature assembly 40 is decoupled from the control valve member 61, the armature assembly 40 does not move with the control valve member 61, but rather the armature assembly 40 moves independently of the control valve member 61 through an interaction with the magnetic field produced by the solenoid coil 29. When the control valve member 61 and the armature assembly 40 come back into contact with one another, then the control valve member 61 and the armature assembly 40 are considered to be coupled, or recoupled. When the armature assembly 40 and the control valve member 61 are coupled, the movement of the control valve member 61 is at least partially dependent on the movement of the armature assembly 40, and vice versa.

The control valve member 61 controls the movement of the valve needle member 90 by controlling the flow of high-pressure fuel passing between the low-pressure valve seat 64 and the high-pressure valve seat 65. The valve needle member 90 in turn, controls the flow of fuel through the nozzle outlet 92. The valve needle member 90 has an opening hydraulic surface 93 located, and exposed to fuel pressure, between a first end 88 and a second end 89 of the valve needle member 90 and a closing hydraulic surface 94 located at the first end 88 of the valve needle member 90. The closing hydraulic surface 94 of the valve needle member 90 is exposed to the pressure inside a needle control chamber 86. The opening hydraulic surface 93 of the valve needle member 90 may be located inside a nozzle chamber 91. The nozzle chamber 91 may receive high-pressure fuel entering through a rail pressure inlet port 99 via a nozzle supply passage 98. In the present disclosure, high-pressure fuel is coming from a common rail, and the nozzle chamber 91 may be fluidly connected to the rail pressure inlet port 99 via the unobstructed nozzle supply passage 98, thereby maintaining rail pressure inside the nozzle chamber 91. An unobstructed supply passage means the supply passage does not have any structures therein to affect the flow of fuel, such as a valve that may at least partially stop the supply of fuel by closing or partially closing the passage. Nevertheless, a fuel injector that includes an obstruction, such as an admission valve, in the nozzle supply passage 98 would still fall within the intended scope of the disclosure.

A pressure communication passage 79 establishes a fluid connection between the nozzle chamber 91 and the solenoid actuated valve assembly 60. The pressure communication passage 79 also fluidly connects the nozzle chamber 91 to the needle control chamber 86 via a first flow restrictor 95. The pressure communication passage 79 may have an unobstructed fluid passage to the needle control chamber 86, meaning the fluid passage has no structure to affect the flow of fuel, such as a valve that may stop the flow of fuel through the pressure communication passage 79.

A second flow restrictor 96 having a larger flow area than the first flow restrictor 95 fluidly connects the needle control chamber 86 to either high-pressure fuel or to a low-pressure fuel drain. When the control valve member 61 is at the low-pressure valve seat 64, a first annular opening 68 fluidly connects the high-pressure fuel from the nozzle chamber 91 to the needle control chamber 86 via the second flow restrictor 96. When the control valve member 61 is at the high-pressure valve seat 65, the second flow restrictor 96 fluidly connects the needle control chamber 86 to a low-pressure drain 83 via a second annular opening 69 and the valve supply passage 84. The needle control chamber 86 remains fluidly connected to the nozzle chamber 91 via the first flow restrictor 95 regardless of the position of the control valve member 61. In the present disclosure, the valve supply passage 84 and the drain 83 are shown as dotted passages because passage 84 and drain 83 lie in a plane not depicted in the section views of FIGS. 1 and 2. The valve supply passage 84 has a first end that opens into the second flow restrictor 96, and a second end that opens into the region between the low-pressure valve seat 64 and the high-pressure valve seat 65. This allows the valve supply passage 84 to fluidly connect the needle control chamber 86 to the drain 83 when the control valve member 61 is at the high-pressure valve seat 65 and to the high-pressure fuel from the nozzle chamber 91 when the control valve member 61 is at the low-pressure valve seat 64. The drain 83 fluidly connects the second annular opening 69 to an external drain line. The first annular opening 68 may be located above the high-pressure valve seat 65 such that when the control valve member 61 is seated at the low-pressure valve seat 64, the first annular opening 68 opens a fluid connection between the high-pressure nozzle chamber 91 and the needle control chamber 86. The second annular opening 69 may be located below the low-pressure valve seat 64, such that when the control valve member 61 is seated at the high-pressure valve seat 65, the second annular opening 69 opens a fluid connection between the nozzle chamber 91 and the drain 83 via the needle control chamber 86. Those skilled in the art may recognize that there are various ways of controlling the flow of fuel through the nozzle outlet 92 via a solenoid actuated valve assembly, including the direct operated check described herein. The direct operated check described herein allows the valve needle member 90 to be directly controlled by the movement of the control valve member 61 by varying the pressure acting inside the needle control chamber 86.

A nozzle spring 59 may bias the valve needle member 90 towards the nozzle outlet 92. When the valve needle member 90 blocks the nozzle outlet 92, the valve needle member 90 is in a closed position such that no fuel exits the nozzle outlet 92. The valve needle member 90 may move away from the nozzle outlet 92 against the direction of the bias of the nozzle spring 59 to an open position. When the valve needle member 90 is at the open position, fuel may eject from the nozzle outlet 92.

Fuel injectors operate within high-pressure conditions and may be assembled by clamping stacked components on top of each other. Due to the high pressures within the injector body 11, a load screw 54 or similar clamping mechanism may be used to hold the individual components together, including the valve assembly 60, within the injector body 11. Also, during the assembly of a fuel injector, those skilled in the art may appreciate the importance of aligning the guide piece 43 relative to the guide bore 33 such that the guide piece 43 may move freely within the guide bore 33 with minimal side forces acting on the inner guide surface 32 of the guide sleeve 31, thereby reducing wear potential and eliminating slowdown of the travel speed of the armature assembly 40.

In the present disclosure, the armature contact surface 49 of the control valve member 61 or the valve contact surface 48 of the armature assembly 40 may have a convex tip, while the other may have a flat tip. Further, either the stop surface 47 of the guide piece 43 or the guide stop surface 55 of the final air gap spacer 53 may also have a convex tip, while the other has a flat tip. Generally, when a convex tip makes contact with a flat tip, there is a point-to-surface contact, which may reduce side forces that potentially cause misalignment. The interrelationship between a convex surface and a flat surface reduces the sensitivity to misalignment, and therefore further reduces the variability in performance by desensitizing the movement of the valve member from the misalignment of the armature assembly. Alternative embodiments may have two flat surfaces contact each other but any surface contours of the surfaces fall within the intended scope of the disclosure.

INDUSTRIAL APPLICABILITY

The present disclosure finds potential application in solenoid actuated valve assemblies in any engine or machine. For instance, the teachings of the present disclosure are pertinent to solenoid actuated valve assemblies where a valve member and an armature can be guided in their respective movements by different components of the valve assembly. The present disclosure has a general applicability in fuel injectors having a solenoid actuated valve assembly and a particular applicability in common rail fuel injectors.

Generally, a solenoid actuated valve assembly is in a first configuration when the solenoid coil is energized as shown in FIG. 3, and in a second configuration when the solenoid coil is de-energized as shown in FIG. 4. An injection event in a fuel injector is initiated when the solenoid coil is energized and ends when the solenoid coil is de-energized.

In the present disclosure, before an injection event is initiated, the solenoid coil 29 is de-energized. The armature assembly 40 and the control valve member 61 are biased towards a first configuration, where the valve contact surface 48 of the armature assembly 40 and the armature contact surface 49 of the control valve member 61 are in contact. In the first configuration, the armature assembly 40 and the control valve member 61 are coupled. The first spring 56 biases the armature assembly 40 towards the control valve member 61, while the second spring 58 biases the control valve member 61 towards the armature assembly 40. Because the first spring 56 has a greater preload than the second spring 58, the valve member 61 may be seated at the low-pressure valve seat 64.

When the valve assembly 60 is in the first configuration, the first annular opening 68 allows the needle control chamber 86 to have a fluid connection with the high-pressure nozzle chamber 91 via the pressure communication passage 79 and the valve supply passage 84. In this configuration, high-pressure fuel from the rail pressure inlet port 99 passes through the nozzle chamber 91, then passes through the pressure communication passage 79 up to the first annular opening 68 of the valve assembly 60 and through the valve supply passage 84 into the needle control chamber 86 via the second flow restrictor 96. Also, high-pressure fuel from the nozzle chamber 91 passes into the needle control chamber 86 through the first flow restrictor 95 via pressure communication passage 79. The high-pressure fuel in the needle control chamber 86 acts on the closing hydraulic surface 94 of the valve needle member 90, thereby biasing the valve needle member 90 towards the nozzle outlet 92, because the pressure exerted on the closing hydraulic surface 94 combined with the preload of the nozzle spring 59 is greater than the pressure acting on the opening hydraulic surface 93. In this configuration, no fuel flows through the nozzle outlet 92.

When the solenoid coil 29 is energized, the solenoid actuated valve assembly 60 moves towards the second configuration. The magnetic field around the coil 29 pulls the flux piece 45 towards the planar bottom surface 26 of the stator assembly 21. The armature assembly 40 decouples from the control valve member 61 before the control valve member 61 begins to move towards the stator assembly 21. In an exemplary embodiment, the armature assembly 40 moves at an initial acceleration that is greater than the initial acceleration of the control valve member 61. The armature assembly 40 continues to accelerate towards the stator assembly 21 as the air gap between the armature assembly 40 and the stator assembly 21 decreases, due to the increased magnetic flux acting on the flux piece 45. The control valve member 61, on the other hand, has an acceleration that is determined at least partially by the material properties of the second spring 58. By decoupling the armature assembly 40 from the control valve member 61 before the control valve member 61 begins to move, those skilled in the art will appreciate that the movements of the armature assembly 40 and the control valve member 61 are independent of each other, and therefore both the armature assembly 40 and the control valve member 61 are desensitized to the movement of the other. This may make the operation of solenoid actuated valve assemblies more predictable. The armature assembly 40 decouples from the control valve member 61 because the armature assembly 40 has an armature travel speed that is greater than a valve travel speed of the control valve member 61. In an alternate embodiment, as the flux piece 45 is being pulled towards the stator assembly 21 by the magnetic flux of the solenoid coil 29, both the armature assembly 40 and the control valve member 61 move together towards the stator assembly 21 until a later point in time, when the magnetic force acting on the armature assembly 40 pulls the armature assembly 40 out of contact with the control valve member 61. In another alternate embodiment, the armature assembly 40 decouples from the control valve member 61 and moves towards the final air gap position of the armature assembly 40 once the control valve member 61 reaches the high-pressure valve seat 65. This may happen if the armature assembly 40 has an armature travel speed that is equal to the travel speed of the control valve member 61.

However, the exemplary embodiment of the disclosure teaches that the travel speed of the armature assembly 40 is greater than the travel speed of the control valve member 61, thereby allowing the armature assembly 40 to decouple from the control valve member 61 before the control valve member 61 starts moving under the action of spring 58. This is advantageous because decoupling the armature assembly 40 from the control valve member 61 desensitizes the control valve member 61 from the variability of the movement of the armature assembly 40 and vice versa, therefore allowing both the control valve member 61 and the armature assembly 40 to desensitize their own movements from the movements of the other component. The armature assembly 40 stops when the guide piece 43 of the armature assembly 40 makes contact with the stop spacer 53 at the final air gap position of the armature assembly 40. The difference in the armature travel speed and the valve travel speed may depend upon the magnetic force acting on the flux piece 45, as well as the preload of the first spring 56 and second spring 58. The valve contact surface 48 of the armature assembly 40 and the armature contact surface 49 of the control valve member 61 are decoupled, i.e., not in contact, when the armature assembly 40 travels towards the stator assembly 21 faster than the control valve member 61 travels towards the high-pressure valve seat 65. The control valve member 61 travels at a speed that is a function of the preload of the second spring 58. Further, the control valve member 61 moves from the low-pressure valve seat 64 to the high-pressure valve seat 65, and once the control valve member 61 reaches the high-pressure valve seat 65, the control valve member 61 stays in the high-pressure valve seat 65 at least until the solenoid coil 29 is de-energized. The solenoid actuated valve assembly 60 is now in the second configuration when the control valve member 61 and the armature assembly 40 are decoupled and the armature assembly 40 is at the final air gap position.

When the control valve member 61 is seated at the high-pressure valve seat 65, the control valve member 61 blocks the fluid connection between the first annular opening 68 with the valve supply passage 84, and instead allows the second annular opening 69 to fluidly connect the needle control chamber 86 to the drain 83 via the valve supply passage 84. Because the drain 83 is at a lower pressure than rail pressure, the pressure difference allows fuel, which was at high pressure inside the needle control chamber 86, to flow through the second flow restrictor 96 into the drain 83 via the second annular opening 69. The second flow restrictor 96 may have a greater flow rate than the flow rate of the first flow restrictor 95. Therefore, more fuel can leave the needle control chamber 86 via the second flow restrictor 96 than the fuel that can enter the needle control chamber 86 via the first flow restrictor 95. Hence, the pressure inside the needle control chamber 86 becomes lower as more fuel is leaving the needle control chamber 86. As the pressure inside the needle control chamber 86 drops, the pressure acting on the closing hydraulic surface 94 also drops. Eventually, the pressure acting on the opening hydraulic surface 93 exceeds the combined force of the pressure acting on the closing hydraulic surface 94 and the preload of the nozzle spring 59, causing the valve needle member 90 to move away from the nozzle outlet 92, thereby opening the nozzle outlet 92 and allowing fuel to flow through the nozzle outlet 92.

To end the injection event, the solenoid coil 29 is de-energized, thereby collapsing and causing quick decay of the magnetic field around the stator assembly 21. The first spring 56 biases the armature assembly 40 towards the control valve member 61 and the control valve member 61 remains at the high-pressure valve seat 65 until the armature assembly 40 comes into contact with the control valve member 61 and recouples with the valve member 61, whereby, the valve contact surface 48 of the armature assembly 40 presses upon the armature contact surface 49 of the control valve member 61. Because the preload of the first spring 56 is greater than the preload of the second spring 58, the armature assembly 40 is biased towards the control valve member 61 and thereby, the flux piece 45 travels from the final air gap position to the initial air gap position. The valve contact surface 48 of the armature assembly 40 recouples with the armature contact surface 49 of the valve member 61 before the control valve member 61 begins to move towards the low-pressure valve seat 64. This is because the second spring 58 continues to bias the control valve member 61 towards the high-pressure valve seat 65. However, when the armature assembly 40 contacts the control valve member 61, the force from the first spring 56 pushes the control valve member 61 against the bias of the second spring 58 towards the low-pressure valve seat 64. Hence, the control valve member 61 moves from the high-pressure valve seat 65 to the low-pressure valve seat 64 because the first spring 56 has a greater preload than the second spring 58.

The solenoid actuated valve assembly 60 returns to the first configuration when the control valve member 61 is at the low-pressure valve seat 64 and the armature assembly 40 is at the initial air gap position and in contact with the control valve member 61. When the control valve member 61 is seated at the low-pressure valve seat 64, the first annular opening 68 allows the pressure communication passage to fluidly connect to the needle control chamber 86 via the second flow restrictor 96. Because the needle control chamber 86 may no longer be fluidly connected to the low-pressure drain 83 but instead, be connected to the pressure communication passage 79, which provides high-pressure fuel, high-pressure fuel may begin to accumulate in the needle control chamber 86, thereby increasing the pressure acting on the closing hydraulic surface 94 of the valve needle member 90. This pressure acting on the closing hydraulic surface 94 combined with the preload of the nozzle spring 59 eventually exceeds the pressure acting on the opening hydraulic surface 93, and forces the valve needle member 90 to return to its closed position and stop any fluid from exiting the nozzle outlet 92. Hence, no fuel will be flowing within the fuel injector 10 as the passages have returned to a steady pressure and the drain 83 is no longer fluidly connected to the needle control chamber 86.

By separating the control valve member from the armature assembly, manufacturers may now isolate the problems pertaining to the armature and associated guide piece from the problems pertinent to the valve member and the associated orientation with the valve seats. The present disclosure allows manufacturers to design solenoid actuated valve assemblies that may be desensitized to offset centerlines. Further, the valve travel speed may now be determined by spring preloads, as opposed to the travel speed of the armature assembly, which is dictated by the solenoid. By making the valve travel speed independent of the armature travel speed, manufacturers may produce fuel injectors with less variability and more reliability. In addition, decoupling the armature assembly and the valve member may reduce the sensitivity to variations in solenoid operation. Finally, manufacturers may now produce fuel injectors that demonstrate a more consistent, predictable valve behavior in mass-produced valve assemblies having inherent geometrical tolerance differences.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure, and the appended claims.

What is claimed is:

1. A valve assembly comprising:
    an armature of a solenoid being movable between a first armature position and a second armature position defined by an armature travel distance;
    a control valve member being movable between a first valve stop position and a second valve stop position defined by a valve travel distance;
    the armature travel distance being greater than the valve travel distance;
    the armature moves in a direction away from the control valve member responsive to energization of a coil of the solenoid;
    the armature includes a valve contact surface;
    the control valve member includes an armature contact surface;
    the armature contact surface being in contact with the valve contact surface when the armature is at the first armature position and the control valve member is at the first valve stop position; and
    the armature contact surface being out of contact with the valve contact surface when the armature is at the second armature position and the control valve member is at the second valve stop position.

2. The valve assembly of claim 1, wherein the armature is movable independent of the control valve member and the control valve member is movable independent of the armature when decoupled.

3. The valve assembly of claim 1, further including a first spring and a second spring, wherein:
    the armature is biased towards the control valve member by the first spring; and
    the control valve member is biased towards the armature by the second spring.

4. The valve assembly of claim 3, further including a first spring spacer and a second spring spacer, wherein:
    the first spring spacer sets a first preload on the first spring;
    the second spring spacer sets a second preload on the second spring;
    the first preload greater than the second preload.

5. The valve assembly of claim 4 further including:
    a first spacer determining an initial air gap defined by an initial distance between the armature and a stator assembly when the valve assembly is at the first valve stop position;
    a second spacer determining a final air gap defined by a final distance between the armature and the stator assembly when the valve assembly is at the second valve stop position; and
    a load screw attaching the valve assembly to an injector body;
    wherein one of the valve contact surface and the armature contact surface has a convex tip surface and the other of the valve contact surface and the armature contact surface has a flat surface.

6. The valve assembly of claim 1, wherein one of the valve contact surface and the armature contact surface has a convex tip surface and the other of the valve contact surface and the armature contact surface has a flat surface.

7. The valve assembly of claim 1, further including:
    a first spacer determining an initial air gap defined by an initial distance between the armature and a stator assembly when the valve assembly is at the first valve stop position; and
    a second spacer determining a final air gap defined by a final distance, which is greater than zero, between the armature and the stator assembly when the valve assembly is at the second valve stop position.

8. A fuel injector assembly comprising:
    an injector body defining a nozzle outlet; and
    a valve assembly including a solenoid with a coil and an armature, and a control valve member;
    the armature movable between a first armature position and a second armature position defined by an armature travel distance;
    the control valve member movable between a first valve ~position and a second valve stop position defining a valve travel distance;
    the armature travel distance being greater than the valve travel distance;
    the armature moves in a direction away from the control valve member responsive to energization of the coil of the solenoid;
    the armature includes a valve contact surface;
    the control valve member includes an armature contact surface;
    the armature contact surface being in contact with the valve contact surface when the armature is at the first armature position and the control valve member is at the first valve stop position; and
    the armature contact surface being out of contact with the valve contact surface when the armature is at the second armature position and the control valve member is at the second valve stop position.

9. The fuel injector assembly of claim 8, wherein the injector body defines an inlet port fluidly connected to a nozzle chamber via a nozzle supply passage.

10. The fuel injector assembly of claim 9, further including a valve needle member movable between a first position that closes the nozzle outlet and a second position that opens the nozzle outlet;
    the valve needle member including an opening hydraulic surface exposed to fluid pressure in a nozzle chamber, and a closing hydraulic surface exposed to fluid pressure in a needle control chamber.

11. The fuel injector assembly of claim 10, wherein;
the control valve member being movable between a low-pressure seat at which the needle control chamber is fluidly connected to the nozzle supply passage, and a high-pressure seat at which the needle control chamber is fluidly connected to a low-pressure passage.

12. The fuel injector assembly of claim 11, wherein the injector body defines an unobstructed passage fluidly connecting the needle control chamber to the nozzle supply passage.

13. The fuel injector assembly of claim 8, wherein:
the armature is biased towards the control valve member by a first spring having a first preload;
the control valve member is biased towards the armature by a second spring having a second preload; and
the first preload being greater than the second preload.

14. The fuel injector assembly of claim 13, wherein the armature defines an initial air gap as a distance from the armature to a stator assembly at the first armature position, and the armature defines a final air gap, which is greater than zero, as a distance from the armature to the stator assembly at the second armature position;
the armature travel distance being substantially equal to the difference between the final air gap and the initial air gap.

15. A method of operating a fuel injector assembly, comprising the steps of:
initiating an injection event by decoupling an armature of a valve assembly from a control valve member of the valve assembly;
stopping the armature and the control valve member in respective positions out of contact with each other during the injection event;
ending the injection event by coupling the armature to the control valve member; and
stopping the armature and the control valve member in contact with each other after the injection event.

16. The method of claim 15 wherein decoupling the armature from the control valve member includes moving the control valve member to a high pressure seat; and wherein coupling the armature to the control valve member includes moving the control valve member to a low pressure seat.

17. The method of claim 16, further including the steps of:
moving the control valve member from the low pressure seat to the high pressure seat at least partially via a second spring; and
moving the control valve member from the high pressure seat to the low pressure seat via a first spring.

18. The method of claim 15, further including a step of:
maintaining a fluid connection between a nozzle chamber and a rail between injection events.

* * * * *